United States Patent [19]

Tomforde

[11] Patent Number: 4,475,148
[45] Date of Patent: Oct. 2, 1984

[54] DIFFUSING LENS FOR MOTOR VEHICLE LIGHTS

[75] Inventor: Johann Tomforde, Sindelfingen, Fed. Rep. of Germany

[73] Assignee: Daimler-Benz Aktiengesellschaft, Fed. Rep. of Germany

[21] Appl. No.: 354,613

[22] Filed: Mar. 4, 1982

[30] Foreign Application Priority Data

Apr. 3, 1981 [DE] Fed. Rep. of Germany ....... 3108059

[51] Int. Cl.³ .............................................. F21V 7/00
[52] U.S. Cl. .................................... 362/269; 362/80; 362/83; 362/306; 362/369; 362/390
[58] Field of Search ................... 362/80, 83, 269, 306, 362/369, 390

[56] References Cited

U.S. PATENT DOCUMENTS 3,280,323 10/1966 Pawlowski .......................... 362/390
4,345,307 8/1982 Mayer ................................. 362/390
4,360,859 11/1982 Ziaylek ................................. 362/80

FOREIGN PATENT DOCUMENTS 2419843 11/1979 France ................................. 362/390

*Primary Examiner*—Donald P. Walsh
*Attorney, Agent, or Firm*—Craig & Burns

[57] ABSTRACT

To largely prevent bodily injury to a pedestrian or cyclist involved in a collision with a passenger motor vehicle with an impact in a headlight area of the vehicle, the headlights are flexibly disposed. For this purpose, a diffusing lens for the headlights is provided with a rearwardly slanted cover plate above a light exit area of the diffusing lens. The cover plate forms a part of the outer contour or shape of the vehicle and essentially maintains the original shape upon an impact load. The cover plate has a length corresponding at least to approximately a half of a height of the light exit area, with a free end of the cover plate being elastically supported by a fixed component of the vehicle.

10 Claims, 2 Drawing Figures

DIFFUSING LENS FOR MOTOR VEHICLE LIGHTS

The present invention relates to a lens and, more particularly, to a diffusing lens for car headlights formed as a light unit arranged so as to be flexible in a longitudinal direction of the motor vehicle under an impact load. The light unit including a housing swingably or pivotably mounted to a fixed component of the vehicle, and with the diffusing lens being extended above a light exit area thereof by a rearwardly slanted cover plate.

In, for example, Offenlegungsschrift No. 2,727,517, a diffusing lens of the aforementioned type is proposed primarily as a protective measure for components of a high accident risk exposure such as, for example, motor vehicle headlights.

In addition to providing protection for motor vehicle headlights from an impact load due to, for example, a collison, it is also necessary to reduce, to the largest extent possible, injury causing impact to a pedestrian or bicyclist involved in a collision with the motor vehicle. With, for example, a pedestrian, during a first phase of frontal collision, the pedestrian is picked up by the bumper and then, under horizontal force action, strikes an upper edge of the headlights and/or leading edge of the front hood in an area of the thigh and/or pelvic area. During a second phase of a frontal collision with a pedestrian, the impact of the upper body and head on the front hood and surrounding front components of the motor vehicle occurs.

With the arrangement proposed in the aforementioned Offenlegungsschrift, while property damage is reduced or even prevented in a collision with a vehicle and/or a stationary obstacle, a disadvantage of this proposed construction resides in the fact that in a collision of the motor vehicle with a pedestrian, the unyielding rigid vehicle components and, in particular, the leading edge of the front hood may cause considerable injury to the pedestrian.

The aim underlying the present invention essentially resides in disposing or arranging high accident risk components on a front portion of a motor vehicle in such a manner that not only is property damage largely prevented but also, in particular, bodily injury.

In accordance with advantageous features of the present invention, a cover plate is provided for a light of a motor vehicle, with the cover plate forming a portion of an outer shape of the vehicle and essentially maintaining its shape when acted upon by an impact load. The cover plate has a length corresponding to at least approximately half of a height of a light exit area, with a free end of the cover plate being elastically supported by a fixed component of the vehicle.

By virtue of the above constructional features of the present invention a diffusing lens and cover plate is advantageously fashioned as a one or multilayered elastic plastic and or glass plastic compound system, which enables an impact load of a pedestrian to be cushioned on the overall light unit due to the resiliency of the diffusing lens and cover plate.

Additionally, by virtue of the features of the present invention, rigid zones formed by front parts of the motor vehicle and, in particular, the front edge of a hood and/or fenders of the vehicle and the frame for the headlights as well as the mounting flanges are removed or displaced from the frontal impact area.

In accordance with the present invention, an elastic support is disposed between a rear edge of the cover plate and a front edge of the hood and/or fender of the motor vehicle thereby resulting in a targeted resilience to an impact load acting upon the light unit.

In accordance with further injury reducing features of the present invention, the cover plate is advantageously provided exteriorly or interiorly with a protective foil and, for stylistic considerations, it is also possible to paint or coat the protective foil outside of the light exit area.

In accordance with still further features of the present invention, additional lights may be disposed inside the light unit forming the headlights at a position, for example, above a reflector of the headlights.

Accordingly, it is an object of the present invention to provide a diffusing lens for lights of a motor vehicle which avoids, by simple means, shortcomings and disadvantages encountered in the prior art.

Another object of the present invention resides in providing a diffusing lens for lights of a motor vehicle which minimizes impact forces of a pedestrian struck by the motor vehicle.

Yet another object of the present invention resides in providing a diffusing lens for lights of a motor vehicle which minimizes property damage resulting from a collision.

A still further object of the present invention resides in providing a protective arrangement for high accident risk components arranged at a front portion of a motor vehicle.

Another object of the present invention resides in providing a diffusing lens for lights of a motor vehicle which is simple in construction and therefore relatively inexpensive to manufacture.

These and other objects, features, and advantages of the present invention will become more apparent from the following description when taken in connection with the accompanying drawing which shows, for the purposes of illustration only, one embodiment in accordance with the present invention, and wherein.

Figure 1:
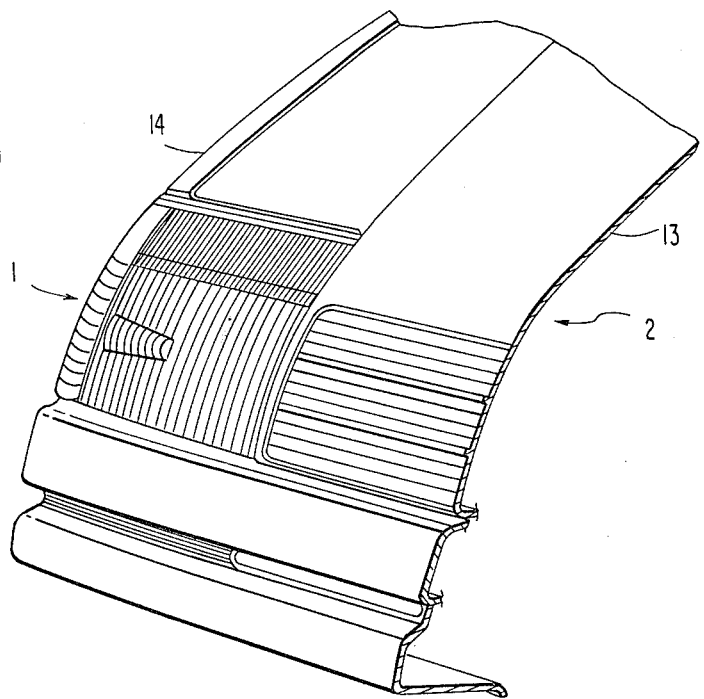
FIG. 1 is a partial front view of a passenger motor vehicle.

Referring now to the drawings wherein like reference numerals are used in both views to designate like parts and, more particularly, to FIG. 1, wherein according to this figure, a light unit generally designated by the reference numeral 1 is flexibly attached to a vehicle generally designated by the reference numeral 2 in an area of a hood 13 and fender 14 of the motor vehicle.

Figure 2:
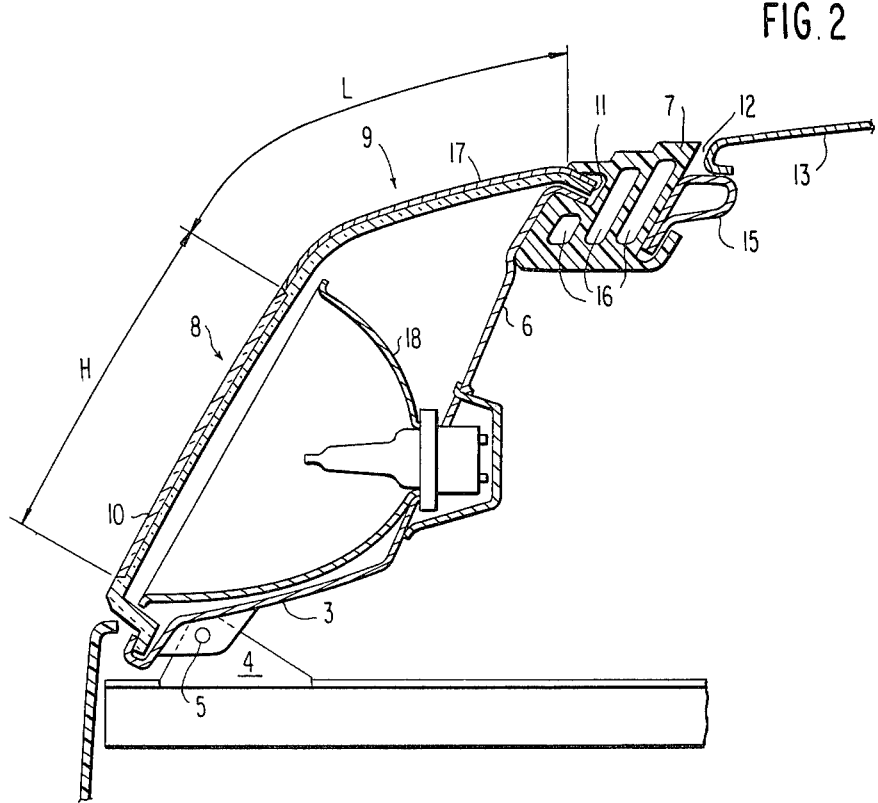
FIG. 2 is a longitudinal cross sectional view of a light unit construction in accordance with the present invention.

As shown most clearly in FIG. 2, a lower housing compartment 3 of the light unit 1 is mounted to a fixed component of the vehicle so as to be pivotable about an axis 5, with an upper housing component 6 being held or secured to a cross frame 15 by an elastic support 7.

A diffusing lens generally designated by the reference numeral 8 extends beyond an upper light exit area H into a rearwardly slanted cover plate generally designated by the reference numeral 9, with the cover plate 9 forming a part of the skin of the motor vehicle. The cover plate 9 has a length L corresponding at least approximately to half of a height of the light exit area H. The cover plate 9 and diffusing may be fashioned in one piece of an elastic plastic material with optical means 10 being molded or shaped to the light exit area H.

The elastic support 7 is attached to the cross frame between a rear edge 11 of the cover plate 9 and a front edge 12 of the hood 13 and or fender 14 of the vehicle. The elastic support is provided with several hollow chambers 16. In order to provide further protection against injury, the cover plate 9 may be provided exteriorly and/or interiorly with a transparent or painted protective foil 17.

It is also possible in accordance with the present invention, to provide additional lights in the light unit such as, for example, turn signal lights, position lights, additional headlights, etc. at a position above the headlight reflector 18.

While I have shown and described only one embodiment in accordance with the present invention, it is understood that the same is not limited thereto but is susceptible of numerous changes and modifications as known to one having ordinary skill in the art and I therefore do not wish to be limited to the details shown and described herein, but intend to cover all such modifications as are encompassed by the scope of the appended claims.

I claim:

1. A light arrangement for motor vehicles comprising housing means mounted to a fixed component of a vehicle accommodating a light unit means for providing headlighting for said vehicle, light diffusing means forming a part of the contoured exterior of the vehicle for covering said housing means, and means for mounting the housing means and light diffusing means to said vehicle in a manner allowing movement of said housing means and light diffusing means relative to the fixed component in the longitudinal direction of the vehicle under an impact load, said means for mounting including means for pivotally mounting a first portion of the housing means relative to the vehicle and elastic means for elastically supporting a second portion of the housing means relative to the vehicle, said light diffusing means including a light exit area and an inclined cover plate means, said inclined cover plate means extending generally rearwardly of the vehicle from said light exit area and having a length corresponding to at least approximately one half of the length of the light exit area, said light diffusing means being constructed in a manner to allow resilient cushioning of an impact thereon, whereby the light arrangement minimizes property damage and personal injury.

2. A light arrangement according to claim 1 wherein the coverplate means and light exit area of the light diffusing means are formed in one piece of an elastic material with an optical means molded in the light exit area of the light diffusing means.

3. A light arrangement according to claim 1, wherein light diffusing means is formed of a plurality of layers of at least one of a glass and plastic material, and the optical means is provided in at least one of the layers in the light exit area.

4. A light arrangement according to one of claims 1, 2, or 3, wherein the elastic means is arranged between a rear edge of the cover plate means and a front edge of at least one of a hood and fender of the vehicle.

5. A light arrangement according to claim 4, wherein a protective means is provided in at least one of interiorily and exteriorly of the cover plate means.

6. A light arrangement according to claim 5, wherein the protective means is at least one of a transparent and painted protective foil.

7. A light arrangement according to claim 6, wherein the light means unit includes a light reflector means and additional lights disposed in the light unit means above the reflector means.

8. A light arrangement according to claim 7, wherein the light unit means includes a headlight unit of the vehicle.

9. A light arrangement according to one of claims 1, 2, or 3, wherein a protective means is provided in at least one of interiorily and exteriorly of the cover plate means.

10. A light arrangement according to one of claims 1, 2, or 3, wherein the light unit means includes a light reflector means and additional lights disposed in the light unit above the reflector means.

* * * * *

UNITED STATES PATENT AND TRADEMARK OFFICE
CERTIFICATE OF CORRECTION

PATENT NO. : 4,475,148

DATED : October 2, 1984

INVENTOR(S) : Johann Tomforde

It is certified that error appears in the above-identified patent and that said Letters Patent is hereby corrected as shown below:

ON THE TITLE PAGE

[30] Foreign Application Priority Data,
"Apr. 3, 1981" should be --Mar. 4, 1981--.

Signed and Sealed this

Eighteenth Day of June 1985

[SEAL]

Attest:

DONALD J. QUIGG

Attesting Officer     Acting Commissioner of Patents and Trademarks